US008774423B1

(12) United States Patent
Solbach

(10) Patent No.: US 8,774,423 B1
(45) Date of Patent: Jul. 8, 2014

(54) SYSTEM AND METHOD FOR CONTROLLING ADAPTIVITY OF SIGNAL MODIFICATION USING A PHANTOM COEFFICIENT

(75) Inventor: Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1422 days.

(21) Appl. No.: 12/286,995

(22) Filed: Oct. 2, 2008

Related U.S. Application Data

(63) Continuation-in-part of application No. 12/215,980, filed on Jun. 30, 2008.

(51) Int. Cl.
*H04B 15/00* (2006.01)

(52) U.S. Cl.
USPC .......................................... 381/94.1; 381/94.7

(58) Field of Classification Search
USPC ............ 381/92, 94.1, 94.2, 4.3, 94, 7, 93, 98, 381/95, 96, 66, 83; 704/233, 226, 225
See application file for complete search history.

(56) References Cited

U.S. PATENT DOCUMENTS

| | | | |
|---|---|---|---|
| 3,976,863 | A | 8/1976 | Engel |
| 3,978,287 | A | 8/1976 | Fletcher et al. |
| 4,137,510 | A | 1/1979 | Iwahara |
| 4,433,604 | A | 2/1984 | Ott |
| 4,516,259 | A | 5/1985 | Yato et al. |
| 4,536,844 | A | 8/1985 | Lyon |
| 4,581,758 | A | 4/1986 | Coker et al. |
| 4,628,529 | A | 12/1986 | Borth et al. |
| 4,630,304 | A | 12/1986 | Borth et al. |
| 4,649,505 | A | 3/1987 | Zinser, Jr. et al. |
| 4,658,426 | A | 4/1987 | Chabries et al. |
| 4,674,125 | A | 6/1987 | Carlson et al. |
| 4,718,104 | A | 1/1988 | Anderson |
| 4,811,404 | A | 3/1989 | Vilmur et al. |
| 4,812,996 | A | 3/1989 | Stubbs |
| 4,864,620 | A | 9/1989 | Bialick |

(Continued)

FOREIGN PATENT DOCUMENTS

| | | |
|---|---|---|
| JP | 62110349 | 5/1987 |
| JP | 4184400 | 7/1992 |

(Continued)

OTHER PUBLICATIONS

International Search Report dated May 29, 2003 in Application No. PCT/US03/04124.

(Continued)

*Primary Examiner* — Ping Lee
(74) *Attorney, Agent, or Firm* — Carr & Ferrell LLP

(57) ABSTRACT

Systems and methods for controlling adaptivity of signal modification, such as noise suppression, using a phantom coefficient are provided. The process for controlling adaptivity comprises receiving a signal. Determinations may be made of whether an adaptation coefficient satisfies an adaptation constraint and of whether the phantom coefficient satisfies the adaptation constraint. The phantom coefficient may be updated, for example, toward a current observation. The adaptation coefficient may be updated, for example, toward the phantom coefficient, based on whether the phantom coefficient satisfies an adaptation constraint of the signal. A modified signal may be generated by applying the adaptation coefficient to the signal based on whether the adaptation coefficient satisfies the adaptation constraint. Accordingly, the modified signal may be outputted.

20 Claims, 8 Drawing Sheets

(56) References Cited

U.S. PATENT DOCUMENTS

| | | | | |
|---|---|---|---|---|
| 4,920,508 | A | 4/1990 | Yassaie et al. | |
| 5,027,410 | A | 6/1991 | Williamson et al. | |
| 5,054,085 | A | 10/1991 | Meisel et al. | |
| 5,058,419 | A | 10/1991 | Nordstrom et al. | |
| 5,099,738 | A | 3/1992 | Hotz | |
| 5,119,711 | A | 6/1992 | Bell et al. | |
| 5,142,961 | A | 9/1992 | Paroutaud | |
| 5,150,413 | A | 9/1992 | Nakatani et al. | |
| 5,175,769 | A | 12/1992 | Hejna, Jr. et al. | |
| 5,187,776 | A | 2/1993 | Yanker | |
| 5,208,864 | A | 5/1993 | Kaneda | |
| 5,210,366 | A | 5/1993 | Sykes, Jr. | |
| 5,230,022 | A | 7/1993 | Sakata | |
| 5,319,736 | A | 6/1994 | Hunt | |
| 5,323,459 | A | 6/1994 | Hirano | |
| 5,341,432 | A | 8/1994 | Suzuki et al. | |
| 5,381,473 | A | 1/1995 | Andrea et al. | |
| 5,381,512 | A | 1/1995 | Holton et al. | |
| 5,400,409 | A | 3/1995 | Linhard | |
| 5,402,493 | A | 3/1995 | Goldstein | |
| 5,402,496 | A | 3/1995 | Soli et al. | |
| 5,471,195 | A | 11/1995 | Rickman | |
| 5,473,702 | A | 12/1995 | Yoshida et al. | |
| 5,473,759 | A | 12/1995 | Slaney et al. | |
| 5,479,564 | A | 12/1995 | Vogten et al. | |
| 5,502,663 | A | 3/1996 | Lyon | |
| 5,544,250 | A | 8/1996 | Urbanski | |
| 5,574,824 | A | 11/1996 | Slyh et al. | |
| 5,583,784 | A | 12/1996 | Kapust et al. | |
| 5,587,998 | A | 12/1996 | Velardo, Jr. et al. | |
| 5,590,241 | A | 12/1996 | Park et al. | |
| 5,602,962 | A | 2/1997 | Kellermann | |
| 5,675,778 | A | 10/1997 | Jones | |
| 5,682,463 | A | 10/1997 | Allen et al. | |
| 5,694,474 | A | 12/1997 | Ngo et al. | |
| 5,706,395 | A | 1/1998 | Arslan et al. | |
| 5,717,829 | A | 2/1998 | Takagi | |
| 5,729,612 | A | 3/1998 | Abel et al. | |
| 5,732,189 | A | 3/1998 | Johnston et al. | |
| 5,749,064 | A | 5/1998 | Pawate et al. | |
| 5,757,937 | A | 5/1998 | Itoh et al. | |
| 5,792,971 | A | 8/1998 | Timis et al. | |
| 5,796,819 | A | 8/1998 | Romesburg | |
| 5,806,025 | A | 9/1998 | Vis et al. | |
| 5,809,463 | A | 9/1998 | Gupta et al. | |
| 5,825,320 | A | 10/1998 | Miyamori et al. | |
| 5,839,101 | A | 11/1998 | Vahatalo et al. | |
| 5,920,840 | A | 7/1999 | Satyamurti et al. | |
| 5,933,495 | A | 8/1999 | Oh | |
| 5,943,429 | A | 8/1999 | Handel | |
| 5,956,674 | A | 9/1999 | Smyth et al. | |
| 5,974,380 | A | 10/1999 | Smyth et al. | |
| 5,978,824 | A * | 11/1999 | Ikeda | 704/E21.014 |
| 5,983,139 | A | 11/1999 | Zierhofer | |
| 5,990,405 | A | 11/1999 | Auten et al. | |
| 6,002,776 | A | 12/1999 | Bhadkamkar et al. | |
| 6,061,456 | A | 5/2000 | Andrea et al. | |
| 6,072,881 | A | 6/2000 | Linder | |
| 6,097,820 | A | 8/2000 | Turner | |
| 6,108,626 | A | 8/2000 | Cellario et al. | |
| 6,122,610 | A | 9/2000 | Isabelle | |
| 6,134,524 | A | 10/2000 | Peters et al. | |
| 6,137,349 | A | 10/2000 | Menkhoff et al. | |
| 6,140,809 | A | 10/2000 | Doi | |
| 6,173,255 | B1 | 1/2001 | Wilson et al. | |
| 6,180,273 | B1 | 1/2001 | Okamoto | |
| 6,216,103 | B1 | 4/2001 | Wu et al. | |
| 6,222,927 | B1 | 4/2001 | Feng et al. | |
| 6,223,090 | B1 | 4/2001 | Brungart | |
| 6,226,616 | B1 | 5/2001 | You et al. | |
| 6,263,307 | B1 | 7/2001 | Arslan et al. | |
| 6,266,633 | B1 | 7/2001 | Higgins et al. | |
| 6,317,501 | B1 | 11/2001 | Matsuo | |
| 6,339,758 | B1 | 1/2002 | Kanazawa et al. | |
| 6,355,869 | B1 | 3/2002 | Mitton | |
| 6,363,345 | B1 | 3/2002 | Marash et al. | |
| 6,381,570 | B2 | 4/2002 | Li et al. | |
| 6,430,295 | B1 | 8/2002 | Handel et al. | |
| 6,434,417 | B1 | 8/2002 | Lovett | |
| 6,449,586 | B1 | 9/2002 | Hoshuyama | |
| 6,469,732 | B1 | 10/2002 | Chang et al. | |
| 6,487,257 | B1 | 11/2002 | Gustafsson et al. | |
| 6,496,795 | B1 | 12/2002 | Malvar | |
| 6,513,004 | B1 | 1/2003 | Rigazio et al. | |
| 6,516,066 | B2 | 2/2003 | Hayashi | |
| 6,529,606 | B1 | 3/2003 | Jackson, Jr. II et al. | |
| 6,549,630 | B1 | 4/2003 | Bobisuthi | |
| 6,584,203 | B2 | 6/2003 | Elko et al. | |
| 6,622,030 | B1 | 9/2003 | Romesburg et al. | |
| 6,717,991 | B1 | 4/2004 | Gustafsson et al. | |
| 6,718,309 | B1 | 4/2004 | Selly | |
| 6,738,482 | B1 | 5/2004 | Jaber | |
| 6,760,450 | B2 | 7/2004 | Matsuo | |
| 6,785,381 | B2 | 8/2004 | Gartner et al. | |
| 6,792,118 | B2 | 9/2004 | Watts | |
| 6,795,558 | B2 | 9/2004 | Matsuo | |
| 6,798,886 | B1 | 9/2004 | Smith et al. | |
| 6,810,273 | B1 | 10/2004 | Mattila et al. | |
| 6,882,736 | B2 | 4/2005 | Dickel et al. | |
| 6,915,264 | B2 | 7/2005 | Baumgarte | |
| 6,917,688 | B2 | 7/2005 | Yu et al. | |
| 6,944,510 | B1 | 9/2005 | Ballesty et al. | |
| 6,978,159 | B2 | 12/2005 | Feng et al. | |
| 6,982,377 | B2 | 1/2006 | Sakurai et al. | |
| 6,999,582 | B1 | 2/2006 | Popovic et al. | |
| 7,016,507 | B1 | 3/2006 | Brennan | |
| 7,020,605 | B2 | 3/2006 | Gao | |
| 7,031,478 | B2 | 4/2006 | Belt et al. | |
| 7,054,452 | B2 | 5/2006 | Ukita | |
| 7,065,485 | B1 | 6/2006 | Chong-White et al. | |
| 7,076,315 | B1 | 7/2006 | Watts | |
| 7,092,529 | B2 | 8/2006 | Yu et al. | |
| 7,092,882 | B2 | 8/2006 | Arrowood et al. | |
| 7,099,821 | B2 | 8/2006 | Visser et al. | |
| 7,142,677 | B2 | 11/2006 | Gonopolskiy et al. | |
| 7,146,316 | B2 | 12/2006 | Alves | |
| 7,155,019 | B2 | 12/2006 | Hou | |
| 7,164,620 | B2 | 1/2007 | Hoshuyama | |
| 7,171,008 | B2 | 1/2007 | Elko | |
| 7,171,246 | B2 | 1/2007 | Mattila et al. | |
| 7,174,022 | B1 | 2/2007 | Zhang et al. | |
| 7,206,418 | B2 | 4/2007 | Yang et al. | |
| 7,209,567 | B1 | 4/2007 | Kozel et al. | |
| 7,225,001 | B1 | 5/2007 | Eriksson et al. | |
| 7,242,762 | B2 | 7/2007 | He et al. | |
| 7,246,058 | B2 | 7/2007 | Burnett | |
| 7,254,242 | B2 | 8/2007 | Ise et al. | |
| 7,359,520 | B2 | 4/2008 | Brennan et al. | |
| 7,412,379 | B2 | 8/2008 | Taori et al. | |
| 2001/0016020 | A1 | 8/2001 | Gustafsson et al. | |
| 2001/0031053 | A1 | 10/2001 | Feng et al. | |
| 2002/0002455 | A1 | 1/2002 | Accardi et al. | |
| 2002/0009203 | A1 | 1/2002 | Erten | |
| 2002/0041693 | A1 | 4/2002 | Matsuo | |
| 2002/0080980 | A1 | 6/2002 | Matsuo | |
| 2002/0106092 | A1 | 8/2002 | Matsuo | |
| 2002/0116187 | A1 | 8/2002 | Erten | |
| 2002/0133334 | A1 | 9/2002 | Coorman et al. | |
| 2002/0147595 | A1 | 10/2002 | Baumgarte | |
| 2002/0184013 | A1 | 12/2002 | Walker | |
| 2003/0014248 | A1 | 1/2003 | Vetter | |
| 2003/0026437 | A1 | 2/2003 | Janse et al. | |
| 2003/0033140 | A1 | 2/2003 | Taori et al. | |
| 2003/0039369 | A1 | 2/2003 | Bullen | |
| 2003/0040908 | A1 | 2/2003 | Yang et al. | |
| 2003/0061032 | A1 | 3/2003 | Gonopolskiy | |
| 2003/0063759 | A1 * | 4/2003 | Brennan et al. | 381/92 |
| 2003/0072382 | A1 | 4/2003 | Raleigh et al. | |
| 2003/0072460 | A1 | 4/2003 | Gonopolskiy et al. | |
| 2003/0095667 | A1 | 5/2003 | Watts | |
| 2003/0099345 | A1 | 5/2003 | Gartner et al. | |
| 2003/0101048 | A1 | 5/2003 | Liu | |
| 2003/0103632 | A1 | 6/2003 | Goubran et al. | |
| 2003/0128851 | A1 | 7/2003 | Furuta | |

(56) References Cited

U.S. PATENT DOCUMENTS

| | | | |
|---|---|---|---|
| 2003/0138116 | A1 | 7/2003 | Jones et al. |
| 2003/0147538 | A1 | 8/2003 | Elko |
| 2003/0169891 | A1* | 9/2003 | Ryan et al. ...................... 381/92 |
| 2003/0228023 | A1 | 12/2003 | Burnett et al. |
| 2004/0013276 | A1 | 1/2004 | Ellis et al. |
| 2004/0047464 | A1 | 3/2004 | Yu et al. |
| 2004/0057574 | A1 | 3/2004 | Faller |
| 2004/0078199 | A1 | 4/2004 | Kremer et al. |
| 2004/0131178 | A1 | 7/2004 | Shahaf et al. |
| 2004/0133421 | A1 | 7/2004 | Burnett et al. |
| 2004/0165736 | A1 | 8/2004 | Hetherington et al. |
| 2004/0196989 | A1 | 10/2004 | Friedman et al. |
| 2004/0263636 | A1 | 12/2004 | Cutler et al. |
| 2005/0025263 | A1 | 2/2005 | Wu |
| 2005/0027520 | A1 | 2/2005 | Mattila et al. |
| 2005/0049864 | A1 | 3/2005 | Kaltenmeier et al. |
| 2005/0060142 | A1 | 3/2005 | Visser et al. |
| 2005/0152559 | A1 | 7/2005 | Gierl et al. |
| 2005/0185813 | A1 | 8/2005 | Sinclair et al. |
| 2005/0213778 | A1 | 9/2005 | Buck et al. |
| 2005/0216259 | A1 | 9/2005 | Watts |
| 2005/0228518 | A1 | 10/2005 | Watts |
| 2005/0276423 | A1 | 12/2005 | Aubauer et al. |
| 2005/0288923 | A1 | 12/2005 | Kok |
| 2006/0072768 | A1 | 4/2006 | Schwartz et al. |
| 2006/0074646 | A1 | 4/2006 | Alves et al. |
| 2006/0098809 | A1 | 5/2006 | Nongpiur et al. |
| 2006/0120537 | A1 | 6/2006 | Burnett et al. |
| 2006/0133621 | A1 | 6/2006 | Chen et al. |
| 2006/0149535 | A1 | 7/2006 | Choi et al. |
| 2006/0184363 | A1 | 8/2006 | McCree et al. |
| 2006/0198542 | A1 | 9/2006 | Benjelloun Touimi et al. |
| 2006/0222184 | A1 | 10/2006 | Buck et al. |
| 2007/0021958 | A1 | 1/2007 | Visser et al. |
| 2007/0027685 | A1 | 2/2007 | Arakawa et al. |
| 2007/0033020 | A1 | 2/2007 | (Kelleher) Francois et al. |
| 2007/0067166 | A1 | 3/2007 | Pan et al. |
| 2007/0078649 | A1 | 4/2007 | Hetherington et al. |
| 2007/0094031 | A1 | 4/2007 | Chen |
| 2007/0100612 | A1 | 5/2007 | Ekstrand et al. |
| 2007/0116300 | A1 | 5/2007 | Chen |
| 2007/0150268 | A1 | 6/2007 | Acero et al. |
| 2007/0154031 | A1 | 7/2007 | Avendano et al. |
| 2007/0165879 | A1 | 7/2007 | Deng et al. |
| 2007/0195968 | A1 | 8/2007 | Jaber |
| 2007/0230712 | A1 | 10/2007 | Belt et al. |
| 2007/0276656 | A1 | 11/2007 | Solbach et al. |
| 2008/0019548 | A1 | 1/2008 | Avendano |
| 2008/0033723 | A1 | 2/2008 | Jang et al. |
| 2008/0140391 | A1 | 6/2008 | Yen et al. |
| 2008/0201138 | A1 | 8/2008 | Visser et al. |
| 2008/0228478 | A1 | 9/2008 | Hetherington et al. |
| 2008/0260175 | A1 | 10/2008 | Elko |
| 2009/0012783 | A1 | 1/2009 | Klein |
| 2009/0012786 | A1 | 1/2009 | Zhang et al. |
| 2009/0129610 | A1 | 5/2009 | Kim et al. |
| 2009/0220107 | A1 | 9/2009 | Every et al. |
| 2009/0238373 | A1 | 9/2009 | Klein |
| 2009/0253418 | A1 | 10/2009 | Makinen |
| 2009/0271187 | A1 | 10/2009 | Yen et al. |
| 2009/0323982 | A1 | 12/2009 | Solbach et al. |
| 2010/0094643 | A1 | 4/2010 | Avendano et al. |
| 2010/0278352 | A1 | 11/2010 | Petit et al. |
| 2011/0178800 | A1 | 7/2011 | Watts |

FOREIGN PATENT DOCUMENTS

| | | |
|---|---|---|
| JP | 5053587 | 3/1993 |
| JP | 6269083 | 9/1994 |
| JP | 10-313497 | 11/1998 |
| JP | 11-249693 | 9/1999 |
| JP | 2005110127 | 4/2005 |
| JP | 2005195955 | 7/2005 |
| WO | 01/74118 | 10/2001 |
| WO | 03/043374 | 5/2003 |
| WO | 03/069499 | 8/2003 |
| WO | 2007/081916 | 7/2007 |
| WO | 2007/140003 | 12/2007 |
| WO | 2010/005493 | 1/2010 |

OTHER PUBLICATIONS

International Search Report and Written Opinion dated Oct. 19, 2007 in Application No. PCT/US07/00463.

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.

International Search Report and Written Opinion dated May 20, 2010 in Application No. PCT/US09/06754.

Fast Cochlea Transform, US Trademark Reg. No. 2,875,755 (Aug. 17, 2004).

Dahl, Mattias et al., “Acoustic Echo and Noise Cancelling Using Microphone Arrays”, International Symposium on Signal Processing and its Applications, ISSPA, Gold coast, Australia, Aug. 25-30, 1996, pp. 379-382.

Demol, M. et al. “Efficient Non-Uniform Time-Scaling of Speech With WSOLA for CALL Applications”, Proceedings of InSTIL/ICALL2004—NLP and Speech Technologies in Advanced Language Learning Systems—Venice Jun. 17-19, 2004.

Laroche, Jean. “Time and Pitch Scale Modification of Audio Signals”, in “Applications of Digital Signal Processing to Audio and Acoustics”, The Kluwer International Series in Engineering and Computer Science, vol. 437, pp. 279-309, 2002.

Moulines, Eric et al., “Non-Parametric Techniques for Pitch-Scale and Time-Scale Modification of Speech”, Speech Communication, vol. 16, pp. 175-205, 1995.

Verhelst, Werner, “Overlap-Add Methods for Time-Scaling of Speech”, Speech Communication vol. 30, pp. 207-221, 2000.

Allen, Jont B. “Short Term Spectral Analysis, Synthesis, and Modification by Discrete Fourier Transform”, IEEE Transactions on Acoustics, Speech, and Signal Processing. vol. ASSP-25, No. 3, Jun. 1977. pp. 235-238.

Allen, Jont B. et al. “A Unified Approach to Short-Time Fourier Analysis and Synthesis”, Proceedings of the IEEE. vol. 65, No. 11, Nov. 1977. pp. 1558-1564.

Avendano, Carlos, “Frequency-Domain Source Identification and Manipulation in Stereo Mixes for Enhancement, Suppression and Re-Panning Applications,” 2003 IEEE Workshop on Application of Signal Processing to Audio and Acoustics, Oct. 19-22, pp. 55-58, New Paltz, New York, USA.

Boll, Steven F. “Suppression of Acoustic Noise in Speech using Spectral Subtraction”, IEEE Transactions on Acoustics, Speech and Signal Processing, vol. ASSP-27, No. 2, Apr. 1979, pp. 113-120.

Boll, Steven F. et al. “Suppression of Acoustic Noise in Speech Using Two Microphone Adaptive Noise Cancellation”, IEEE Transactions on Acoustic, Speech, and Signal Processing, vol. ASSP-28, No. 6, Dec. 1980, pp. 752-753.

Boll, Steven F. “Suppression of Acoustic Noise in Speech Using Spectral Subtraction”, Dept. of Computer Science, University of Utah Salt Lake City, Utah, Apr. 1979, pp. 18-19.

Chen, Jingdong et al. “New Insights into the Noise Reduction Wiener Filter”, IEEE Transactions on Audio, Speech, and Language Processing. vol. 14, No. 4, Jul. 2006, pp. 1218-1234.

Cohen, Israel et al. “Microphone Array Post-Filtering for Non-Stationary Noise Suppression”, IEEE International Conference on Acoustics, Speech, and Signal Processing, May 2002, pp. 1-4.

Cohen, Israel, “Multichannel Post-Filtering in Nonstationary Noise Environments”, IEEE Transactions on Signal Processing, vol. 52, No. 5, May 2004, pp. 1149-1160.

(56) References Cited

OTHER PUBLICATIONS

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.
Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.
"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.
Fuchs, Martin et al. "Noise Suppression for Automotive Applications Based on Directional Information", 2004 IEEE International Conference on Acoustics, Speech, and Signal Processing, May 17-21, pp. 237-240.
Fulghum, D. P. et al., "LPC Voice Digitizer with Background Noise Suppression", 1979 IEEE International Conference on Acoustics, Speech, and Signal Processing, pp. 220-223.
Goubran, R.A. "Acoustic Noise Suppression Using Regression Adaptive Filtering", 1990 IEEE 40th Vehicular Technology Conference, May 6-9, pp. 48-53.
Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.
Haykin, Simon et al. "Appendix A.2 Complex Numbers." Signals and Systems. 2nd Ed. 2003. p. 764.
Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress, Lloyd A. et al. "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.

* cited by examiner

SYSTEM AND METHOD FOR CONTROLLING ADAPTIVITY OF SIGNAL MODIFICATION USING A PHANTOM COEFFICIENT

CROSS-REFERENCE TO RELATED APPLICATIONS

The present application is continuation-in-part of U.S. patent application Ser. No. 12/215,980, filed Jun. 30, 2008 and entitled "System and Method for Providing Noise Suppression Utilizing Null Processing Noise Subtraction," which is incorporated herein by reference. Additionally, the present application is related to U.S. patent application Ser. No. 12/286,909, filed Oct. 2, 2008, entitled "Self Calibration of Audio Device," and to U.S. patent application Ser. No. 12/080,115, filed Mar. 31, 2008, entitled "System and Method for Providing Close-Microphone Adaptive Array Processing," both of which are incorporated herein by reference.

BACKGROUND OF THE INVENTION

1. Field of Invention

The present invention relates generally to audio processing and more particularly to controlling adaptivity of signal modification using phantom coefficients.

2. Description of Related Art

Currently, there are many methods for modifying signals, such as reducing background noise in an adverse audio environment. One such method is to use a stationary noise suppression system. The stationary noise suppression system will always provide an output noise that is a fixed amount lower than the input noise. Typically, the stationary noise suppression is in the range of 12-13 decibels (dB). The noise suppression is fixed to this conservative level in order to avoid producing speech distortion, which will be apparent with higher noise suppression.

In order to provide higher noise suppression, dynamic noise suppression systems based on signal-to-noise ratios (SNR) have been utilized. This SNR may then be used to determine a suppression value. Unfortunately, SNR, by itself, is not a very good predictor of speech distortion due to existence of different noise types in the audio environment. SNR is a ratio of how much louder speech is than noise. However, speech may be a non-stationary signal which may constantly change and contain pauses. Typically, speech energy, over a period of time, will comprise a word, a pause, a word, a pause, and so forth. Additionally, stationary and dynamic noises may be present in the audio environment. The SNR averages all of these stationary and non-stationary speech and noise. There is no consideration as to the statistics of the noise signal; only what the overall level of noise is.

As these various noise suppression schemes become more advanced, the computations required for satisfactory implementation also increases. The number of computations may be directly related to energy use. This becomes especially important in mobile device applications of noise suppression, since increasing computations may have an adverse effect on battery time.

SUMMARY OF THE INVENTION

Embodiments of the present invention overcome or substantially alleviate prior problems associated with signal modification, such as noise suppression and speech enhancement. In exemplary embodiments, the process for controlling adaptivity comprises receiving a signal, such as by one or more microphones. According to some embodiments, a microphone array may receive the signal, wherein the microphone array may comprise a close microphone array or a spread microphone array.

Determinations may be made of whether an adaptation coefficient satisfies an adaptation constraint. Further determinations may be made of whether a phantom coefficient satisfies the adaptation constraint. The phantom coefficient may be updated, for example, toward a current observation. On the other hand, the adaptation coefficient may be updated, for example, toward the phantom coefficient, based on whether the phantom coefficient satisfies an adaptation constraint of the signal. Updating the adaptation coefficient may comprise an iterative process, in accordance with exemplary embodiments.

A modified signal may be generated by applying the adaptation coefficient to the signal based on whether the adaptation coefficient satisfies the adaptation constraint. In exemplary embodiments, the modified signal may be a noise suppressed signal. In other embodiments, however, the modified signal may be a noise subtracted signal. Accordingly, the modified signal may be outputted, for example, to a multiplicative noise suppression system.

DESCRIPTION OF EXEMPLARY EMBODIMENTS

The present invention provides exemplary systems and methods for controlling adaptivity of signal modification using a phantom coefficient. In exemplary embodiments, the signal modification relates to adaptive suppression of noise in an audio signal. Embodiments attempt to balance noise suppression with minimal or no speech degradation (i.e., speech loss distortion). According to various embodiments, noise suppression is based on an audio source location and applies a subtractive noise suppression process as opposed to a purely multiplicative noise suppression process.

Embodiments of the present invention may be practiced on any audio device that is configured to receive sound such as, but not limited to, cellular phones, phone handsets, headsets, and conferencing systems. Advantageously, exemplary embodiments are configured to provide improved noise suppression while minimizing speech distortion. While some embodiments of the present invention will be described in reference to operation on a cellular phone, the present invention may be practiced on any audio device.

Figure 1:
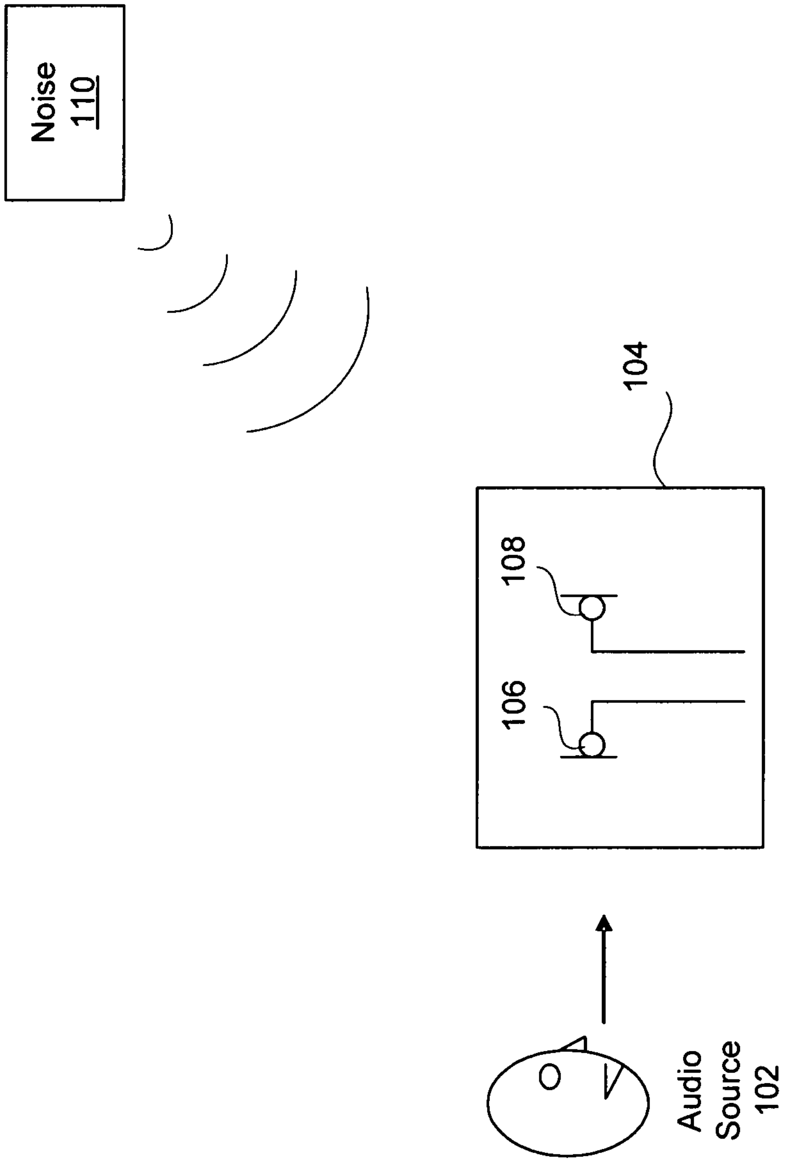
FIG. 1 is an environment in which embodiments of the present invention may be practiced.

Referring to FIG. 1, an environment in which embodiments of the present invention may be practiced is shown. A user acts as a audio source 102 to an audio device 104. The exemplary audio device 104 may include a microphone array. The microphone array may comprise a close microphone array or a spread microphone array.

In exemplary embodiments, the microphone array may comprise a primary microphone 106 relative to the audio source 102 and a secondary microphone 108 located a distance away from the primary microphone 106. While embodiments of the present invention will be discussed with regards to having two microphones 106 and 108, alternative embodiments may contemplate any number of microphones or acoustic sensors within the microphone array. In some embodiments, the microphones 106 and 108 may comprise omni-directional microphones.

While the microphones 106 and 108 receive sound (i.e., acoustic signals) from the audio source 102, the microphones 106 and 108 also pick up noise 110. Although the noise 110 is shown coming from a single location in FIG. 1, the noise 110 may comprise any sounds from one or more locations different than the audio source 102, and may include reverberations and echoes. The noise 110 may be stationary, non-stationary, or a combination of both stationary and non-stationary noise.

Figure 2:
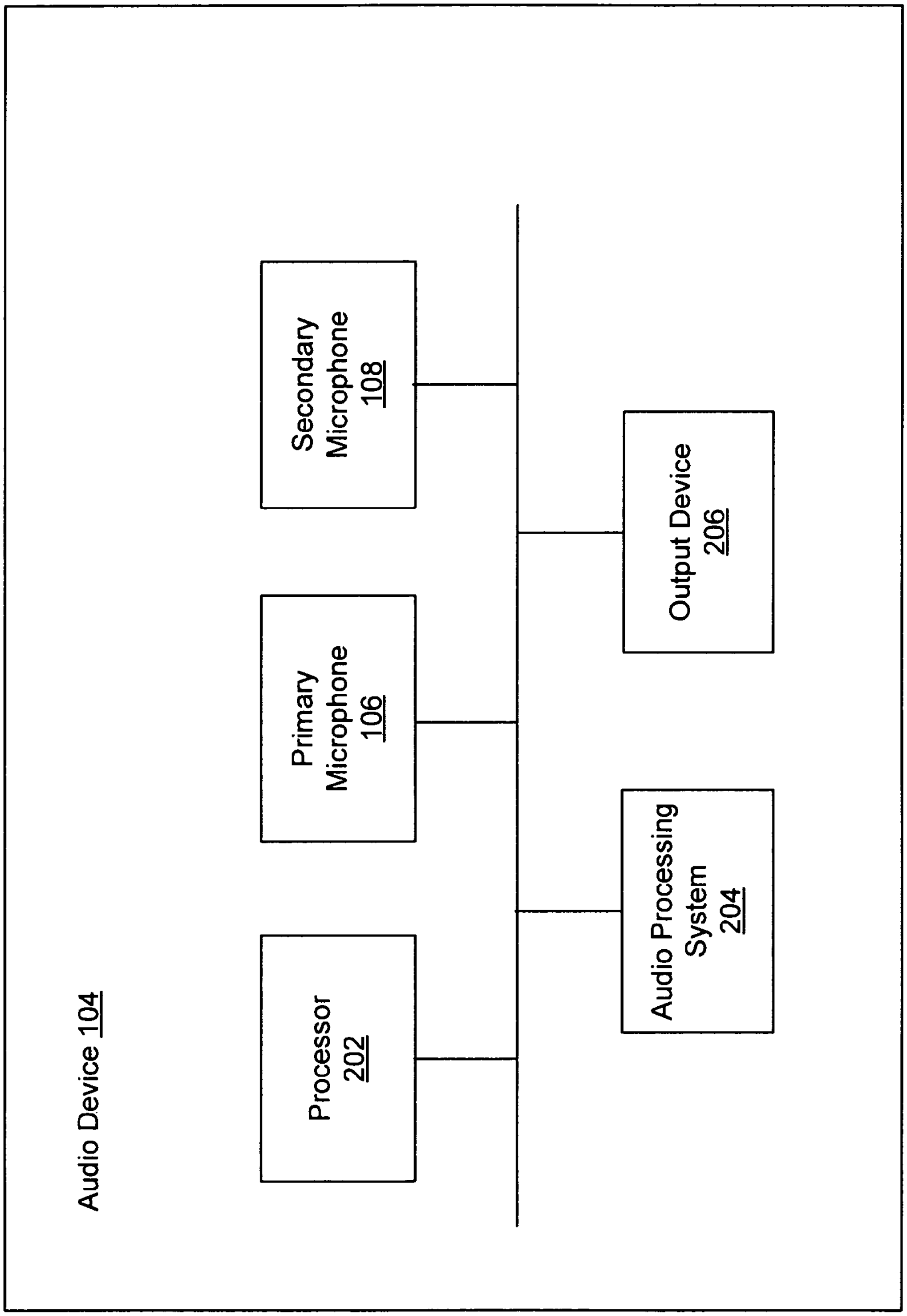
FIG. 2 is a block diagram of an exemplary audio device implementing embodiments of the present invention.

Referring now to FIG. 2, the exemplary audio device 104 is shown in more detail. In exemplary embodiments, the audio device 104 is an audio receiving device that comprises a processor 202, the primary microphone 106, the secondary microphone 108, an audio processing system 204, and an output device 206. The audio device 104 may comprise further components (not shown) necessary for audio device 104 operations. The audio processing system 204 will be discussed in more details in connection with FIG. 3.

In exemplary embodiments, the primary and secondary microphones 106 and 108 are spaced a distance apart in order to allow for an energy level difference between them. Upon reception by the microphones 106 and 108, the acoustic signals may be converted into electric signals (i.e., a primary electric signal and a secondary electric signal). The electric signals may, themselves, be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal.

The output device 206 is any device which provides an audio output to the user. For example, the output device 206 may comprise an earpiece of a headset or handset, or a speaker on a conferencing device. In further embodiments, the output device 206 may transmit the audio output to a receiving audio device.

Figure 3:
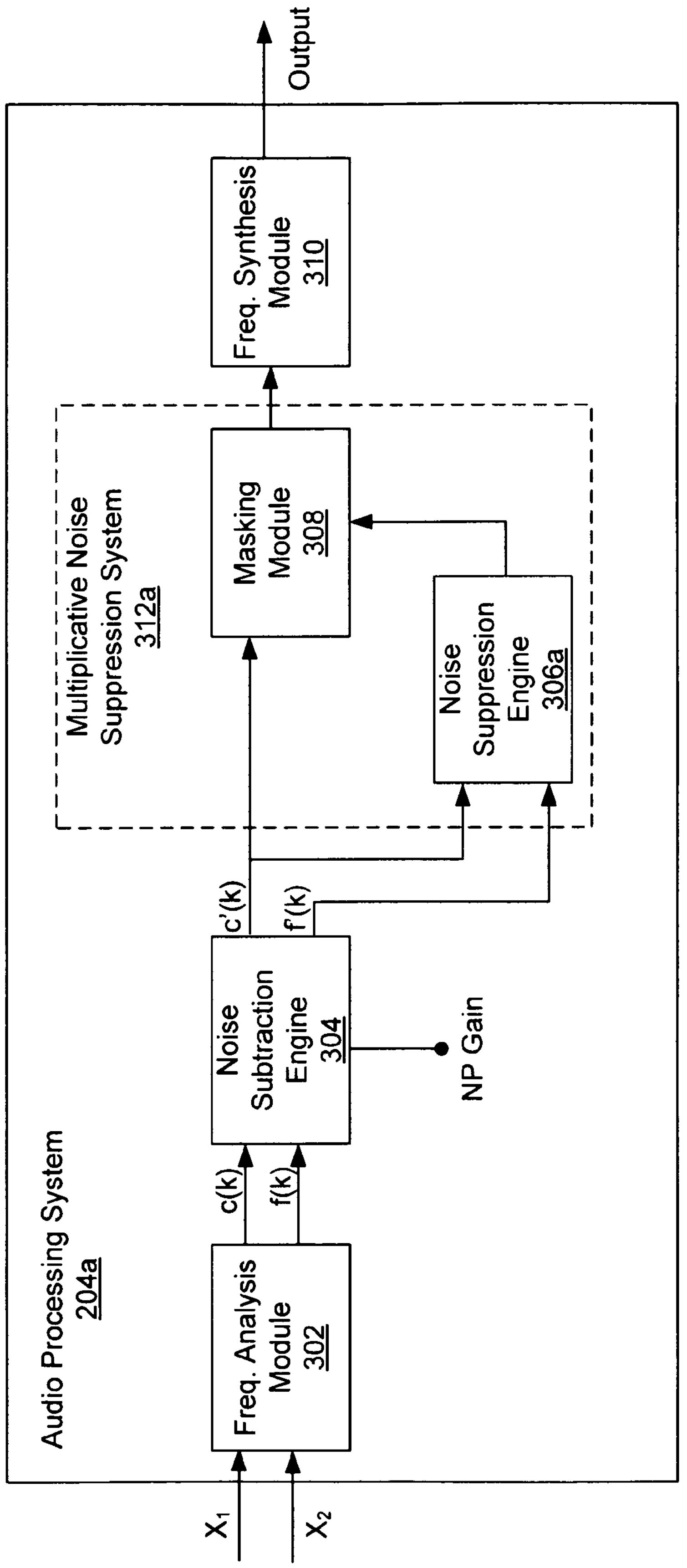
FIG. 3 is a block diagram of an exemplary audio processing system utilizing a spread microphone array.

FIG. 3 is a detailed block diagram of the exemplary audio processing system 204*a* according to one embodiment of the present invention. In exemplary embodiments, the audio processing system 204*a* is embodied within a memory device. The audio processing system 204*a* of FIG. 3 may be utilized in embodiments comprising a spread microphone array.

In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency sub-bands. A sub-band is the result of a filtering operation on an input signal where the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc., can be used for the frequency analysis and synthesis. Because most sounds (e.g., acoustic signals) are complex and comprise more than one frequency, a sub-band analysis on the acoustic signal determines what individual frequencies are present in the complex acoustic signal during a frame (e.g., a predetermined period of time). According to one embodiment, the frame is 8 ms long. Alternative embodiments may utilize other frame lengths or no frame at all. The results may comprise sub-band signals in a fast cochlea transform (FCT) domain.

Once the sub-band signals are determined, the sub-band signals are forwarded to a noise subtraction engine 304. The exemplary noise subtraction engine 304 is configured to adaptively subtract out a noise component from the primary acoustic signal for each sub-band. As such, output of the noise subtraction engine 304 is a noise subtracted signal comprised of noise subtracted sub-band signals. The noise subtraction engine 304 will be discussed in more detail in connection with FIG. 5*a* and FIG. 5*b*. It should be noted that the noise subtracted sub-band signals may comprise desired audio that is speech or non-speech (e.g., music). The results of the noise subtraction engine 304 may be output to the user or processed through a further noise suppression system (e.g., the noise suppression engine 306). For purposes of illustration, embodiments of the present invention will discuss embodiments whereby the output of the noise subtraction engine 304 is processed through a further noise suppression system.

The noise subtracted sub-band signals along with the sub-band signals of the secondary acoustic signal are then provided to the noise suppression engine 306*a*. According to exemplary embodiments, the noise suppression engine 306*a* generates a gain mask to be applied to the noise subtracted sub-band signals in order to further reduce noise components that remain in the noise subtracted speech signal. The noise suppression engine 306*a* is discussed in further detail in U.S. patent application Ser. No. 12/215,980, entitled “System and Method for Providing Noise Suppression Utilizing Null Processing Noise Subtraction,” which has been incorporated by reference.

The gain mask determined by the noise suppression engine 306*a* may then be applied to the noise subtracted signal in a masking module 308. Accordingly, each gain mask may be applied to an associated noise subtracted frequency sub-band to generate masked frequency sub-bands. As depicted in FIG. 3, a multiplicative noise suppression system 312*a* comprises the noise suppression engine 306*a* and the masking module 308.

Next, the masked frequency sub-bands are converted back into time domain from the cochlea domain. The conversion may comprise taking the masked frequency sub-bands and adding together phase shifted signals of the cochlea channels in a frequency synthesis module 310. Alternatively, the conversion may comprise taking the masked frequency sub-bands and multiplying these with an inverse frequency of the cochlea channels in the frequency synthesis module 310. Once conversion is completed, the synthesized acoustic signal may be output to the user.

Figure 4:
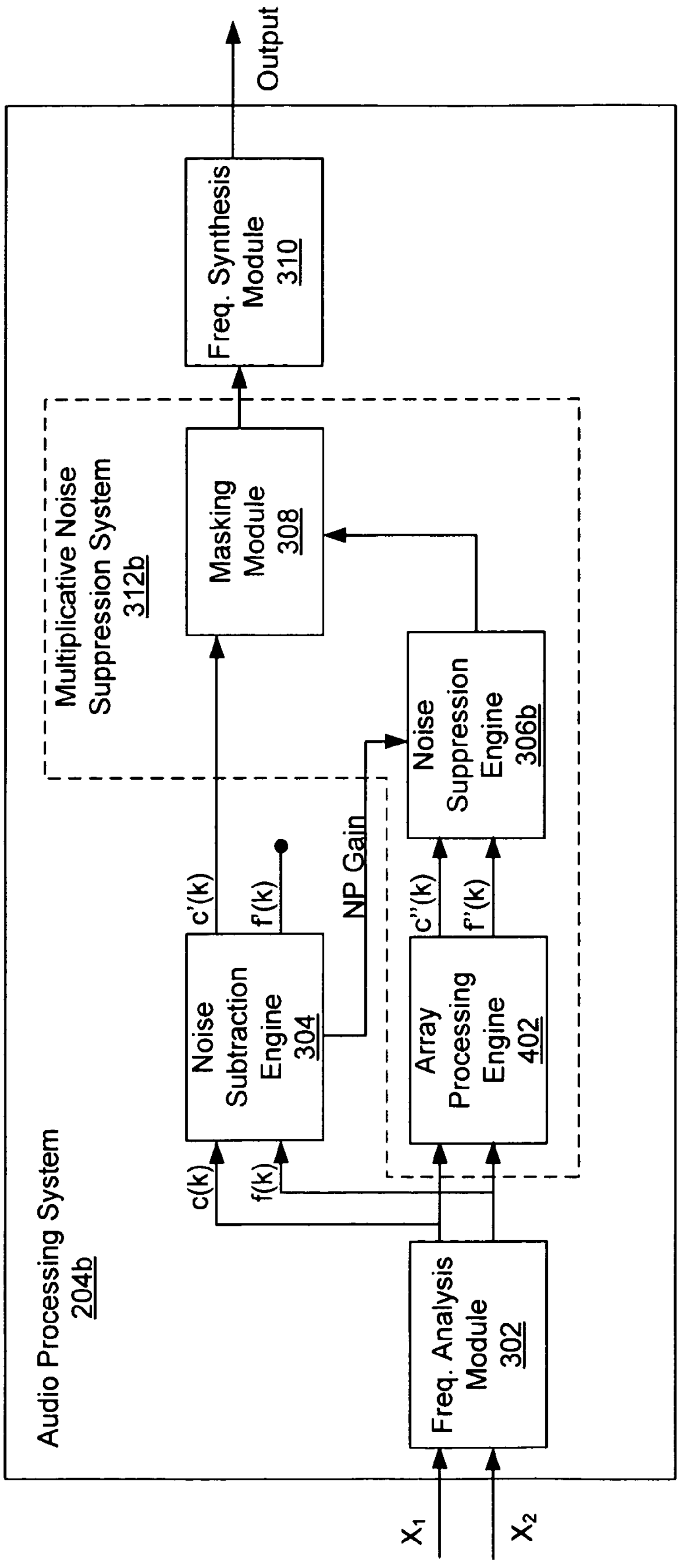
FIG. 4 is a block diagram of an exemplary audio processing system utilizing a close microphone array.

Referring now to FIG. 4, a detailed block diagram of an alternative audio processing system 204*b* is shown. In contrast to the audio processing system 204*a* of FIG. 3, the audio processing system 204*b* of FIG. 4 may be utilized in embodiments comprising a close microphone array. The functions of the frequency analysis module 302, masking module 308, and frequency synthesis module 310 are identical to those described with respect to the audio processing system 204*a* of FIG. 3 and will not be discussed in detail.

The sub-band signals determined by the frequency analysis module 302 may be forwarded to the noise subtraction engine 304 and an array processing engine 402. The exemplary noise subtraction engine 304 is configured to adaptively subtract out a noise component from the primary acoustic signal for each sub-band. As such, output of the noise subtraction engine 304 is a noise subtracted signal comprised of noise subtracted sub-band signals. In the present embodiment, the noise subtraction engine 304 also provides a null processing (NP) gain to the noise suppression engine 306*a*. The NP gain comprises an energy ratio indicating how much of the primary signal has been cancelled out of the noise subtracted signal. If the primary signal is dominated by noise, then NP gain will be large. In contrast, if the primary signal is dominated by speech, NP gain will be close to zero. The noise subtraction engine 304 will be discussed in more detail in connection with FIG. 5*a* and FIG. 5*b* below.

In exemplary embodiments, the array processing engine 402 is configured to adaptively process the sub-band signals of the primary and secondary signals to create directional patterns (i.e., synthetic directional microphone responses) for the close microphone array (e.g., the primary and secondary microphones 106 and 108). The directional patterns may comprise a forward-facing cardioid pattern based on the primary acoustic (sub-band) signals and a backward-facing cardioid pattern based on the secondary (sub-band) acoustic signal. In one embodiment, the sub-band signals may be adapted such that a null of the backward-facing cardioid pattern is directed towards the audio source 102. More details regarding the implementation and functions of the array processing engine 402 may be found (referred to as the adaptive array processing engine) in U.S. patent application Ser. No. 12/080,115 entitled "System and Method for Providing Close-Microphone Adaptive Array Processing," which has been incorporated herein by reference. The cardioid signals (i.e., a signal implementing the forward-facing cardioid pattern and a signal implementing the backward-facing cardioid pattern) are then provided to the noise suppression engine 306*b* by the array processing engine 402.

The noise suppression engine 306*b* receives the NP gain along with the cardioid signals. According to exemplary embodiments, the noise suppression engine 306*b* generates a gain mask to be applied to the noise subtracted sub-band signals from the noise subtraction engine 304 in order to further reduce any noise components that may remain in the noise subtracted speech signal. The noise suppression engine 306*b* is discussed in further detail in U.S. patent application Ser. No. 12/215,980, entitled "System and Method for Providing Noise Suppression Utilizing Null Processing Noise Subtraction," which has been incorporated herein by reference.

The gain mask determined by the noise suppression engine 306*b* may then be applied to the noise subtracted signal in the masking module 308. Accordingly, each gain mask may be applied to an associated noise subtracted frequency sub-band to generate masked frequency sub-bands. Subsequently, the masked frequency sub-bands are converted back into time domain from the cochlea domain by the frequency synthesis module 310. Once conversion is completed, the synthesized acoustic signal may be output to the user. As depicted in FIG. 4, a multiplicative noise suppression system 312*b* comprises the array processing engine 402, the noise suppression engine 306*b*, and the masking module 308.

Figure 5B:
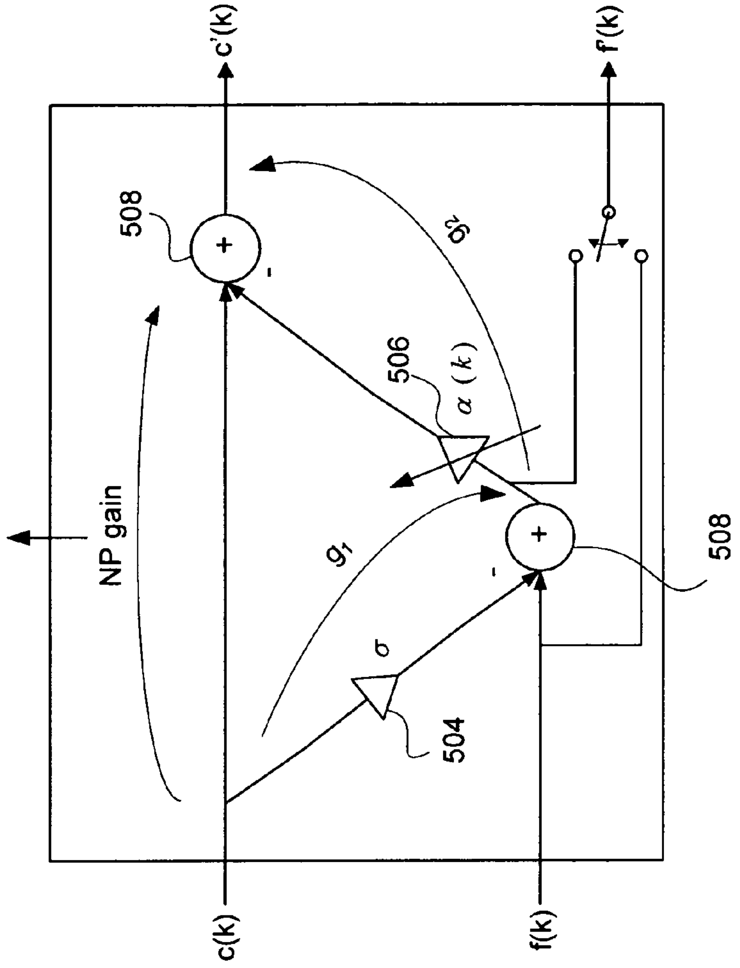
FIG. 5*b* is a schematic illustrating the operations of the noise subtraction engine.
Figure 5A:
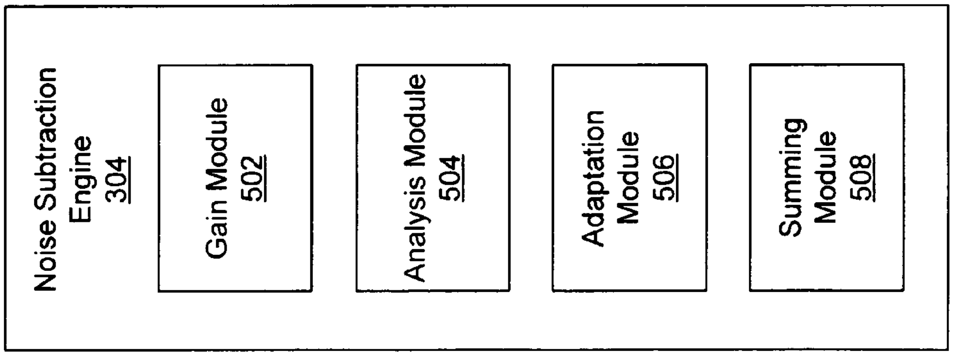
FIG. 5*a* is a block diagram of an exemplary noise subtraction engine.

FIG. 5*a* is a block diagram of an exemplary noise subtraction engine 304. The exemplary noise subtraction engine 304 is configured to suppress noise using a subtractive process. The noise subtraction engine 304 may determine a noise subtracted signal by initially subtracting out a desired component (e.g., the desired speech component) from the primary signal in a first branch, thus resulting in a noise component. Adaptation may then be performed in a second branch to cancel out the noise component from the primary signal. In exemplary embodiments, the noise subtraction engine 304 comprises a gain module 502, an analysis module 504, an adaptation module 506, and at least one summing module 508 configured to perform signal subtraction. The functions of the various modules 502-508 will be discussed in connection with FIG. 5*a* and further illustrated in operation in connection with FIG. 5*b*.

Referring to FIG. 5*a*, the exemplary gain module 502 is configured to determine various gains used by the noise subtraction engine 304. For purposes of the present embodiment, these gains represent energy ratios. In the first branch, a reference energy ratio ($g_1$) of how much of the desired component is removed from the primary signal may be determined. In the second branch, a prediction energy ratio ($g_2$) of how much the energy has been reduced at the output of the noise subtraction engine 304 from the result of the first branch may be determined. Additionally, an energy ratio (i.e., NP gain) may be determined that represents the energy ratio indicating how much noise has been canceled from the primary signal by the noise subtraction engine 304. As previously discussed, NP gain may be used by the AIS generator in the close microphone embodiment to adjust the gain mask.

The exemplary analysis module 504 is configured to perform the analysis in the first branch of the noise subtraction engine 304, while the exemplary adaptation module 506 is configured to control adaptivity in the second branch of the noise subtraction engine 304.

Referring to FIG. 5*b*, a schematic illustration of the operations of the noise subtraction engine 304 is shown. Sub-band signals of the primary microphone signal c(k) and secondary microphone signal f(k) are received by the noise subtraction engine 304 where k represents a discrete time or sample index (i.e., a frame). c(k) represents a superposition of a speech signal s(k) and a noise signal n(k). f(k) is modeled as a superposition of the speech signal s(k), scaled by a complex-valued coefficient $\sigma$, and the noise signal n(k), scaled by a complex-valued coefficient $\nu$. $\sigma$ represents how much of the noise in the primary signal is in the secondary signal. In exemplary embodiments, $\nu$ is unknown since a source of the noise may be dynamic.

In exemplary embodiments, $\sigma$ is a fixed coefficient that represents a location of the speech (e.g., an audio source location). In accordance with exemplary embodiments, $\sigma$ may be determined through calibration. Tolerances may be included in the calibration by calibrating based on more than one position. For a close microphone, a magnitude of $\sigma$ may be close to one. For spread microphones, the magnitude of $\sigma$ may be dependent on where the audio device 104 is positioned relative to the speaker's mouth. The magnitude and phase of the $\sigma$ may represent an inter-channel cross-spectrum for a speaker's mouth position at a frequency represented by the respective sub-band (e.g., Cochlea tap). Because the noise subtraction engine 304 may have knowledge of what $\sigma$ is, the analysis module 504 may apply a to the primary signal (i.e., as(k)+n(k)) and subtract the result from the secondary signal (i.e., $\sigma s(k)+v(k)$) in order to cancel out the speech component $\sigma s(k)$ (i.e., the desired component) from the secondary signal resulting in a noise component out of the summing module 508 after the first branch.

If the speaker's mouth position is adequately represented by $\sigma$, then $f(k)-\sigma c(k)=(v-\sigma)n(k)$. This equation indicates that signal at the output of the summing module 508 being fed into the adaptation module 506 (which, in turn, may apply an adaptation coefficient, $\alpha(k)$, as described further herein) may be devoid of a signal originating from a position represented by $\sigma$ (e.g., the desired speech signal). In exemplary embodiments, the analysis module 504 applies $\sigma$ to the secondary signal f(k) and subtracts the result from c(k). A remaining signal (referred to herein as "noise component signal") from the summing module 508 may be canceled out in the second branch. The adaptation module 506, in accordance with exemplary embodiments, is described further in connection with FIG. 6.

In an embodiment where n(k) is white noise and a cross-correlation between s(k) and n(k) is zero within a frame, adaptation may happen every frame with the noise n(k) being perfectly cancelled and the speech s(k) being perfectly unaffected. However, it is unlikely that these conditions may be met in reality, especially if the frame size is short. As such, it is desirable to apply constraints on adaptation. In exemplary embodiments, the adaptation coefficient, $\alpha(k)$, may be updated on a per-tap/per-frame basis provided that an adaptation constraint is satisfied.

According to exemplary embodiments, the adaptation constraint is satisfied when the reference energy ratio $g_1$ and the prediction energy ratio $g_2$ satisfy the follow condition:

$$g_2 \cdot \gamma > g_1/\gamma$$

where $\gamma>0$. Assuming, for example, that $\hat{\sigma}(k)=\sigma$, $\alpha(k)=1/(v-\sigma)$, and s(k) and n(k) are uncorrelated, the following may be obtained:

$$g_1 = \frac{E\{(s(k)+n(k))^2\}}{|v-\sigma|^2 \cdot E\{n^2(k)\}} = \frac{S+N}{|v-\sigma|^2 \cdot N}$$

and $$g_2 = \frac{|v-\sigma|^2 \cdot E\{n^2(k)\}}{E\{s^2(k)\}} = |v-\sigma|^2 \cdot \frac{N}{S},$$

where E{ . . . } is an expected value, S is a signal energy, and N is a noise energy. From the previous three equations, the following may be obtained:

$$SNR^2 + SNR < \gamma^2 |v-\sigma|^4,$$

where SNR=S/N. Put in terms of the adaptation coefficient, $\alpha(k)$, the adaptation constraint can be written as:

$$\alpha^4 < \gamma^2/SNR^2+SNR).$$

Although the aforementioned adaptation constraint is described herein, any constraint may be used in accordance with various embodiments.

The coefficient $\gamma$ may be chosen to define a boundary between adaptation and non-adaptation of $\alpha$. For example, in a case where a far-field source at 90 degrees angle relative to a straight line between the microphones 106 and 108, the signal may have equal power and zero phase shift between both microphones 106 and 108 (e.g., $v=1$). As such, if the SNR=1, then $\gamma^2|v-\sigma|^4=2$, which is equivalent to $\gamma=\mathrm{sqrt}(2)/|1-\sigma|^4$.

Lowering $\gamma$ relative to this value may improve protection of the near-end source from cancellation at the expense of increased noise leakage; raising $\gamma$ has an opposite effect. It should be noted that in the microphones 106 and 108, $v=1$ may not be a good enough approximation of the far-field/90 degrees situation, and may have to be substituted by a value obtained from calibration measurements.

In some instances, such as when the noise is in the same location as the target speech (i.e., $\sigma=v$), the adaptation constraint, $g_2 \cdot \gamma > g_1/\gamma$, may not be met regardless of the SNR, resulting in adaptation never occurring. In order to overcome this, the adaptation module 506 may invoke a "phantom coefficient," represented herein as $\beta(k)$. The phantom coefficient, $\beta(k)$, is unconstrained, meaning that the phantom coefficient, $\beta(k)$, is always updated with the same time constant as the adaptation coefficient, $\alpha(k)$, regardless of whether the adaptation coefficient, $\alpha(k)$, is updated. In contrast to the adaptation coefficient, $\alpha(k)$, however, the phantom coefficient, $\beta(k)$, is never applied to any signal. Instead, the phantom coefficient, $\beta(k)$, is used to refine the update criteria for the adaptation coefficient, $\alpha(k)$, in an event that the adaptation coefficient, $\alpha(k)$, is frozen as non-adaptive (i.e., the adaptation constraint is not satisfied). The updates of both the adaptation coefficient, $\alpha(k)$, and the phantom coefficient, $\beta(k)$, are described further in connection with FIG. 7 and FIG. 8.

Figure 6:
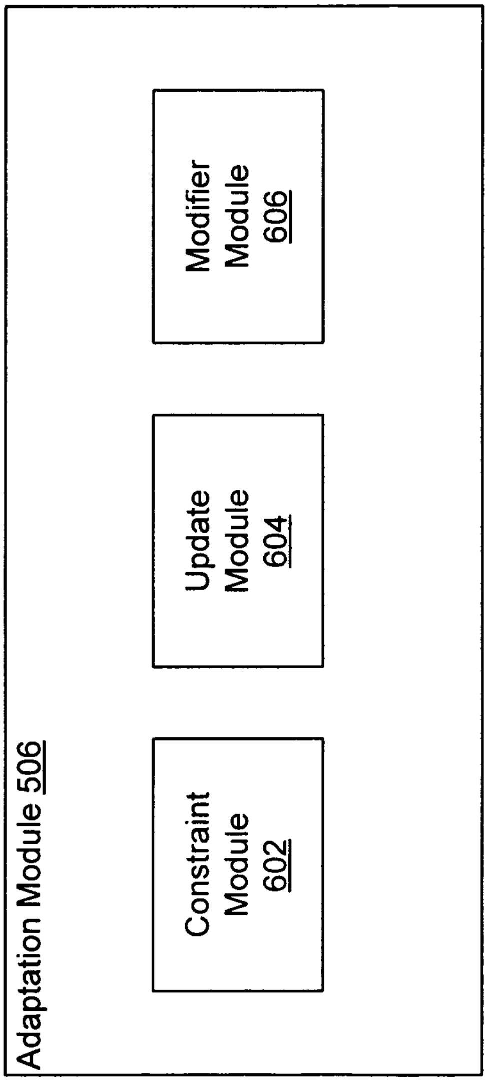
FIG. 6 is a block diagram of an exemplary adaptation module.

In FIG. 6, a block diagram of the adaptation module 506 is presented in accordance with exemplary embodiments. The adaptation module 506, as mentioned, may be configured to control adaptivity, such as in the second branch of the noise subtraction engine 304. As depicted, the adaptation module 506 comprises a constraint module 602, an update module 604, and a modifier module 606.

The constraint module 602 may be configured to determine whether the adaptation coefficient, $\alpha(k)$, satisfies an adaptation constraint (e.g., $g_2 \cdot \gamma > g_1/\gamma$). Accordingly, the constraint module 602 may also be configured to determine whether a phantom coefficient, $\beta(k)$, satisfies the adaptation constraint, as described in connection with FIG. 7.

According to various embodiments, the update module 604 is configured to update the adaptation coefficient, $\alpha(k)$, and phantom coefficient, $\beta(k)$, based on certain criteria. One criterion may be whether or not the adaptation coefficient, $\alpha(k)$, satisfies the adaptation constraint. Another criterion may be whether or not the phantom coefficient, $\beta(k)$ satisfies the adaptation constraint. In some embodiments, the update module 604 is configured to update the adaptation coefficient, $\alpha(k)$, if the adaptation coefficient, $\alpha(k)$, does not satisfy the adaptation constraint but the phantom coefficient, $\beta(k)$, does satisfy the adaptation constraint, and to update the phantom coefficient, $\beta(k)$, regardless of any criteria.

The modifier module 606 is configured to apply the adaptation coefficient, $\alpha(k)$, to the signal in the second branch. In exemplary embodiments, the adaptation module 506 may adapt using one of a common least-squares method in order to cancel the noise component n(k) from the signal c(k). The adaptation coefficient, $\alpha(k)$, may be applied at a frame rate (e.g., 5 frames per second) according to one embodiment.

Figure 7:
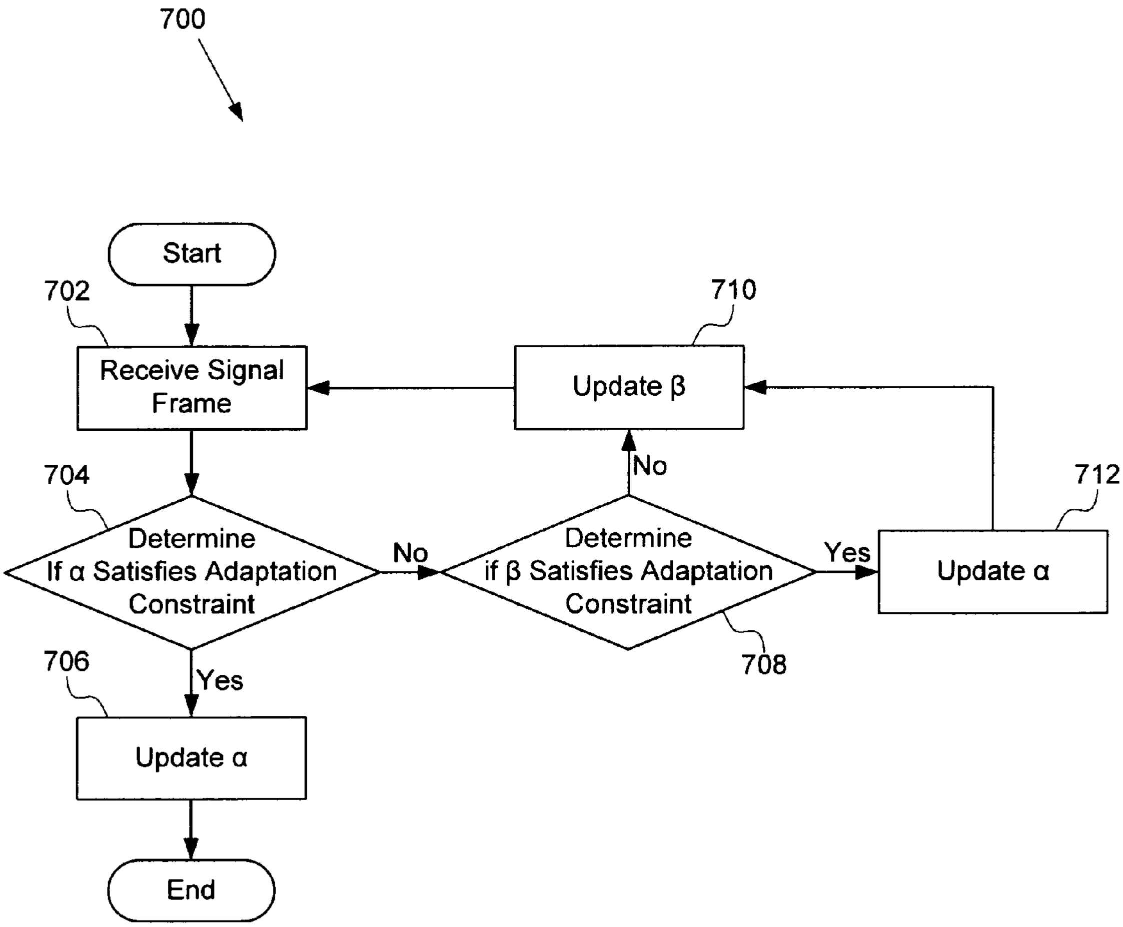
FIG. 7 is a flowchart of an exemplary method for using a phantom coefficient to influence adaptivity of an adaptation coefficient.

FIG. 7 is a flowchart 700 of an exemplary method for using the phantom coefficient, $\beta(k)$, to influence the adaptivity of the adaptation coefficient, $\alpha(k)$. In step 702, a frame of a signal (i.e., a discrete time sample of the signal) is received by the adaptation module 506. In exemplary embodiments, the signal at the output of the summing module 508 of the first branch is fed into the adaptation module 506

In step 704, a determination is made as to whether the adaptation coefficient, α(k), satisfies the adaptation constraint (e.g., $g_2 \cdot \gamma > g_1/\gamma$). According to various embodiments, the constraint module 602 may carry out this determination. If the adaptation coefficient, α(k), does satisfy the adaptation constraint, the adaptation coefficient, α(k), is updated in step 706, which may be carried out by the modifier module 606 in exemplary embodiments. If the adaptation coefficient, α(k), does not satisfy the adaption constraint, however, the method depicted in the flowchart 700 proceeds to step 708.

In step 708, it is determined whether the phantom coefficient, β(k), satisfies the adaptation constraint (e.g., $g_2 \cdot \gamma > g_1/\gamma$). The constraint module 602 may carry out this determination, in accordance with various embodiments. If the phantom coefficient, β(k), does not satisfy the adaptation constraint, the method depicted in the flowchart 700 proceeds directly to step 710. On the other hand, if the phantom coefficient, β(k), does satisfy the adaptation constraint, the method depicted in the flowchart 700 proceeds to step 712.

In step 710, the phantom coefficient, β(k), is updated by one adaptive step towards a current observation, for example, by the update module 604. According to exemplary embodiments, the update of the phantom coefficient may be expressed as:

$$\beta(k+1)=\beta(k)+\lambda(O_c-\beta(k)),$$

where λ is an adaptive step size expressed as a fraction of the distance from the current state of the phantom coefficient, β(k), to the current observation, $O_c$, such that $0<\lambda\leq 1$. The updating of the phantom coefficient, β(k), as well as the adaptation coefficient, α(k), is described further in connection with FIG. 8.

In step 712, the adaptation coefficient, α(k), is updated to approach the phantom coefficient, β(k). As mentioned, the adaptation coefficient, α(k), may be updated by the update module 604. In exemplary embodiments, the update of the adaptation coefficient, α(k), will follow an update path defined by previous updates of the phantom coefficient, β(k). The update path merely describes the update history of the phantom coefficient, β(k), as illustrated in FIG. 8.

As depicted in the flowchart 700, some combination of steps 702, 704, 708, 710, and 712 will repeat until the determination in step 704 affirms that the adaptation coefficient, α(k), satisfies the adaptation constraint.

Figure 8:
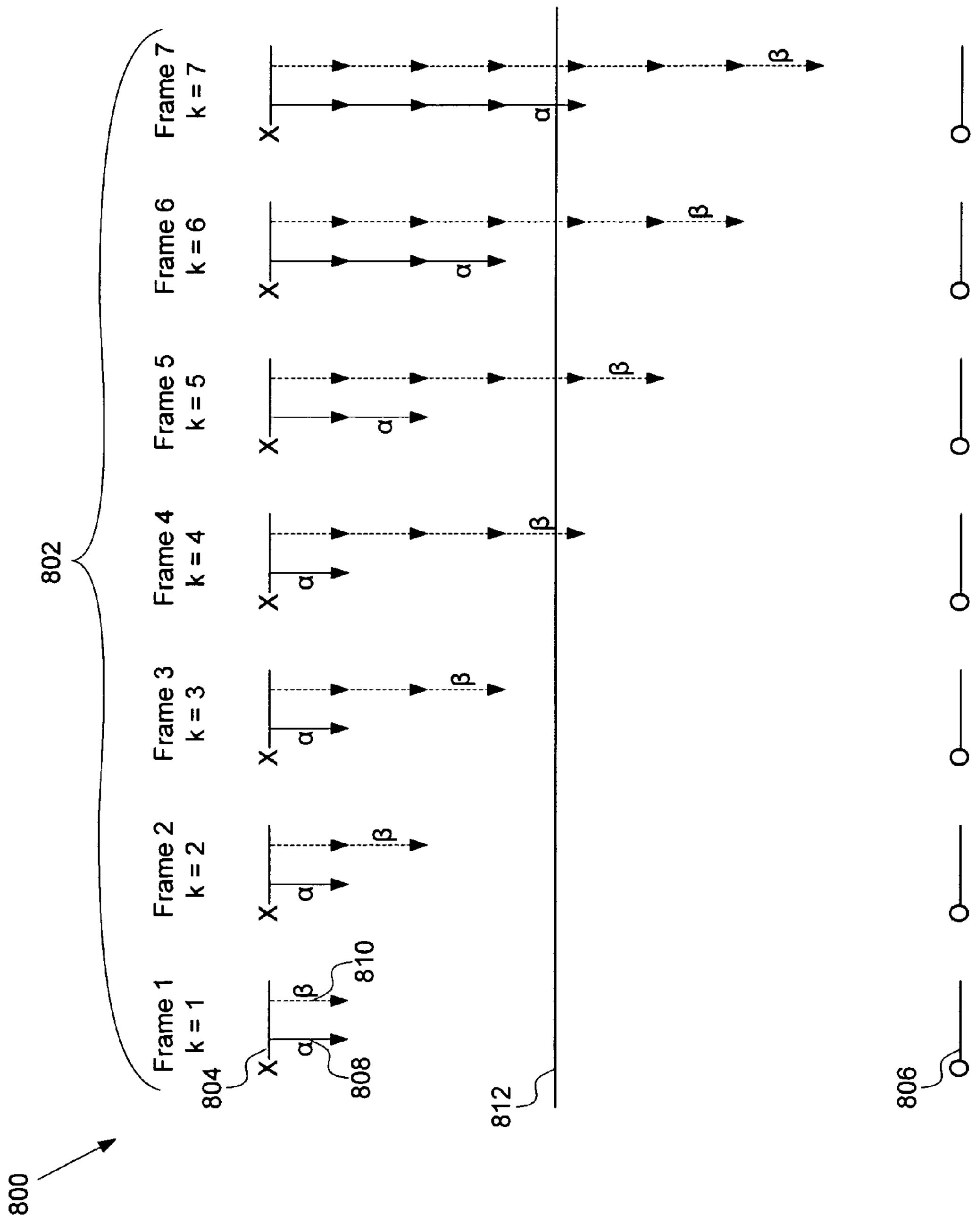
FIG. 8 illustrates an exemplary implementation of the method described in FIG. 7.

Referring now to FIG. 8, an exemplary implementation 800 generically illustrating the method described by the flowchart 700 is presented. A series of frames 802, comprising Frame 1 through Frame 7, are received sequentially by the adaptation module 506. In Frames 1 through 7, k (i.e., discrete time or sample index) equals 1 through 7, respectively. Additionally, each of the frames 802 comprises a depiction of a current estimate 804, a current observation 806, one or more adaptation coefficients 808 (i.e., α), and one or more phantom coefficients 810 (i.e., β). Those skilled in the art will recognize that the adaptation coefficient 808 and the phantom coefficient 810 may comprise complex values. For illustrative purposes, FIG. 8 represents a special case in which the current observation 806 has no imaginary component. Additionally, initial values of both the adaptation coefficient 808 and the phantom coefficient 810 also have no imaginary components.

To avoid clutter in FIG. 8, the current estimate 804, the current observation 806, the adaptation coefficients 808, and the phantom coefficients 810 are only labeled on Frame 1. It is understood, however, that Frames 2 through 7 also comprise the current estimate 804, the current observation 806, the adaptation coefficients 808, and the phantom coefficients 810. Furthermore, a threshold 812, which may be defined by the adaptation constraint, is also depicted in FIG. 8. As illustrated in FIG. 8, adaptation does not occur when the adaptation coefficient 808 is above the threshold 812 (i.e., the adaptation constraint is not satisfied) and, conversely, adaptation does occur when the adaptation coefficient 808 is below the threshold 812 (i.e., the adaptation constraint is satisfied). In other words, the threshold 812 forms a boundary between not adapting and adapting.

In Frame 1, the current estimate 804 and the current observation 806 are on opposite sides of the threshold 812. In accordance with the exemplary method represented by the flowchart 700, the phantom coefficient 810 is updated towards the current observation 806, but the adaptation coefficient 808 is not, since the adaptation coefficient 808 does not satisfy the adaptation constraint represented by threshold 812 (see, e.g., steps 704, 708, and 710). Accordingly, in Frame 2 and Frame 3, the phantom coefficient 810 is further updated towards the current observation 806, still without updating the adaptation coefficient 808. Although update step lengths are depicted in FIG. 8 as being constant, those skilled in the art will appreciate that, in practice, the update step lengths may decrease as the current observation 806 is approached since, for example, $\beta(k+1)=\beta(k)+\lambda(O_c-\beta(k))$, where λ determines the update step length.

In Frame 4, the phantom coefficient 810 satisfies the threshold 812, while the adaptation coefficient 808 still does not. In accordance with step 708, and subsequently step 712 and step 710, both the phantom coefficient 810 and the adaptation coefficient 808 are updated towards the current observation 806 and towards the phantom coefficient 810, respectively, as reflected in Frame 5. In Frame 5 and Frame 6, the phantom coefficient 810 continues to satisfy the threshold 812 resulting in the phantom coefficient 810 being updated towards the current observation 806 and the adaptation coefficient 808 being updated towards the phantom coefficient 810.

In Frame 7, the adaptation coefficient 808 satisfies the threshold 812. Therefore, the adaptation coefficient 808 is applied in the second branch by the adaptation module 506, such as described in connection with FIGS. 7 and 8.

The above-described modules may be comprised of instructions that are stored in storage media such as a machine readable medium (e.g., a computer readable medium). The instructions may be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processors, and storage media.

The present invention is described above with reference to exemplary embodiments. It will be apparent to those skilled in the art that various modifications may be made and other embodiments may be used without departing from the broader scope of the present invention. For example, the microphone array discussed herein comprises a primary and secondary microphone 106 and 108. However, alternative embodiments may contemplate utilizing more microphones in the microphone array. Therefore, there and other variations upon the exemplary embodiments are intended to be covered by the present invention.

What is claimed is:

1. A method for controlling adaptivity of signal modification, comprising:

receiving a signal;

updating a primary adaptation coefficient based on whether the primary adaptation coefficient satisfies an adaptation constraint;

if the primary adaptation coefficient fails to satisfy the adaptation constraint:

updating the primary adaptation coefficient based on whether a secondary adaptation coefficient satisfies the adaptation constraint of the signal, the primary and secondary adaptation coefficients both being based on the signal and updated with the same time constant;

the secondary adaptation coefficient being a phantom coefficient such that the phantom secondary adaptation coefficient is not applied to the signal;

the primary adaptation coefficient being updated toward a current observation if the phantom secondary adaptation coefficient satisfies the adaptation constraint of the signal; and the primary adaptation coefficient not being updated if the phantom secondary adaptation coefficient does not satisfy the adaptation constraint;

generating a modified signal by applying the primary adaptation coefficient to the signal; and outputting the modified signal.

2. The method of claim 1, further comprising determining whether the primary adaptation coefficient satisfies the adaptation constraint.

3. The method of claim 1, further comprising determining whether the phantom secondary adaptation coefficient satisfies the adaptation constraint.

4. The method of claim 1, further comprising updating the phantom secondary adaptation coefficient.

5. The method of claim 4, wherein the phantom secondary adaptation coefficient is updated toward the current observation.

6. The method of claim 1, wherein the primary adaptation coefficient is updated toward the phantom secondary adaptation coefficient.

7. The method of claim 1, wherein updating the primary adaptation coefficient comprises an iterative process.

8. The method of claim 1, wherein the modified signal is a noise suppressed signal.

9. The method of claim 1, wherein the modified signal is a noise subtracted signal.

10. The method of claim 1, wherein the modified signal is outputted to a multiplicative noise suppression system.

11. A system for controlling adaptivity of signal modification, comprising:

a microphone configured to receive a signal;

an update module configured to update a primary adaptation coefficient based on whether the primary adaptation coefficient satisfies an adaptation constraint;

wherein if the primary adaptation coefficient fails to satisfy the adaptation constraint, the update module:

updates the primary adaptation coefficient based on whether a secondary adaptation coefficient satisfies the adaptation constraint of the signal, the primary and secondary adaptation coefficients both being based on the signal and updated with the same time constant;

the secondary adaptation coefficient being a phantom coefficient such that the phantom secondary adaptation coefficient is not applied to the signal;

the primary adaptation coefficient being updated toward a current observation and toward the phantom coefficient if the phantom secondary adaptation coefficient satisfies the adaptation constraint of the signal; and the primary adaptation coefficient not being updated if the phantom secondary adaptation coefficient does not satisfy the adaptation constraint;

a modifier module configured to generate a modified signal by applying the primary adaptation coefficient to the signal; and an output device configured to output the modified signal.

12. The system of claim 11, further comprising a constraint module configured to determine whether the primary adaptation coefficient satisfies the adaptation constraint.

13. The system of claim 11, further comprising a constraint module configured to determine whether the phantom secondary adaptation coefficient satisfies the adaptation constraint.

14. The system of claim 11, wherein the update module is further configured to update the phantom secondary adaptation coefficient.

15. The system of claim 14, wherein the phantom coefficient secondary adaptation is updated toward a current observation.

16. The system of claim 11, wherein the modified signal is a noise suppressed signal.

17. The system of claim 11, wherein the modified signal is a noise subtracted signal.

18. The system of claim 11, wherein the output device is further configured to output the signal to a multiplicative noise suppression system.

19. A non-transitory machine readable storage medium having embodied thereon a program, the program providing instructions executable by a processor for controlling adaptivity of signal modification, the method comprising:

receiving a signal;

updating a primary adaptation coefficient based on whether the primary adaptation coefficient satisfies an adaptation constraint;

if the primary adaptation coefficient fails to satisfy the adaptation constraint:

updating the primary adaptation coefficient based on whether a secondary adaptation coefficient satisfies an adaptation constraint of the signal, the secondary adaptation coefficient being a phantom coefficient, the primary and secondary adaptation coefficient both being based on the signal and updated with the same time constant;

the secondary adaptation coefficient being a phantom coefficient such that the phantom secondary adaptation coefficient is not applied to the signal;

the primary adaptation coefficient being updated toward a current observation if the phantom secondary adaptation coefficient satisfies the adaptation constraint of the signal; and the primary adaptation coefficient not being updated if the phantom secondary adaptation coefficient does not satisfy the adaptation constraint;

generating a modified signal by applying the primary adaptation coefficient to the signal; and outputting the modified signal.

20. A method for controlling adaptivity of signal modification, comprising:

receiving a signal;

updating a primary adaptation coefficient based on whether the primary adaptation coefficient satisfies an adaptation constraint;

if the primary adaptation coefficient fails to satisfy the adaptation constraint:

updating the primary adaptation coefficient based on whether a secondary adaptation coefficient satisfies the adaptation constraint of the signal, the primary and secondary adaptation coefficients both being based on the signal;

the secondary adaptation coefficient not applied to the signal; and the primary adaptation coefficient being updated toward the secondary adaptation coefficient if the secondary adaptation coefficient satisfies the adaptation constraint of the signal; and the primary adaptation coefficient not being updated if the secondary adaptation coefficient does not satisfy the adaptation constraint;

generating a modified signal by applying the primary adaptation coefficient to the signal; and outputting the modified signal.

* * * * *